F. L. MORSE.
SPROCKET CHAIN.
APPLICATION FILED JUNE 27, 1908.
953,427.
Patented Mar. 29, 1910.
2 SHEETS—SHEET 2.
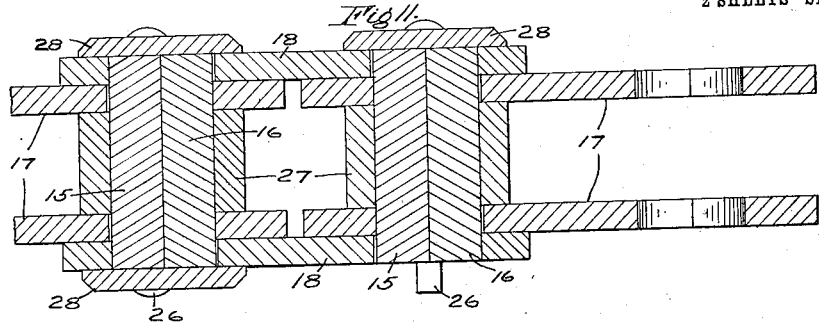
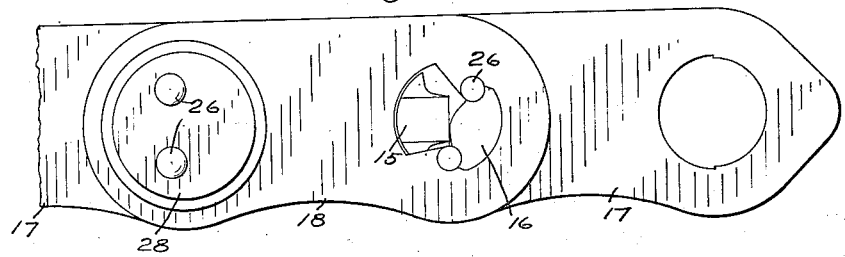
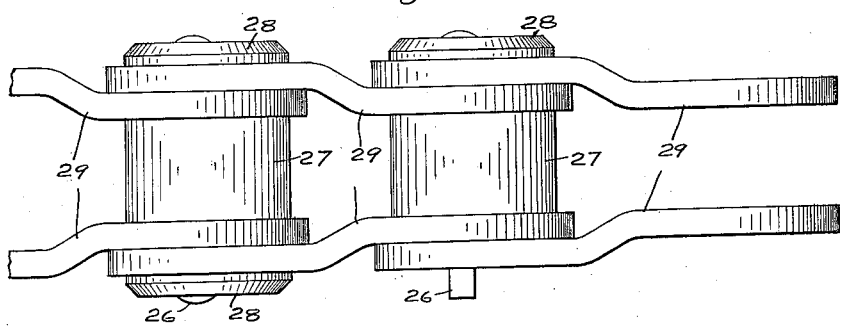
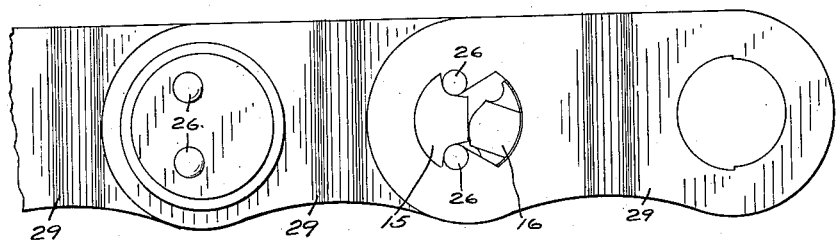
WITNESSES
Wm. M. Cady
J. S. Custer
INVENTOR
Frank L. Morse
by E. N. Wright
Att'y

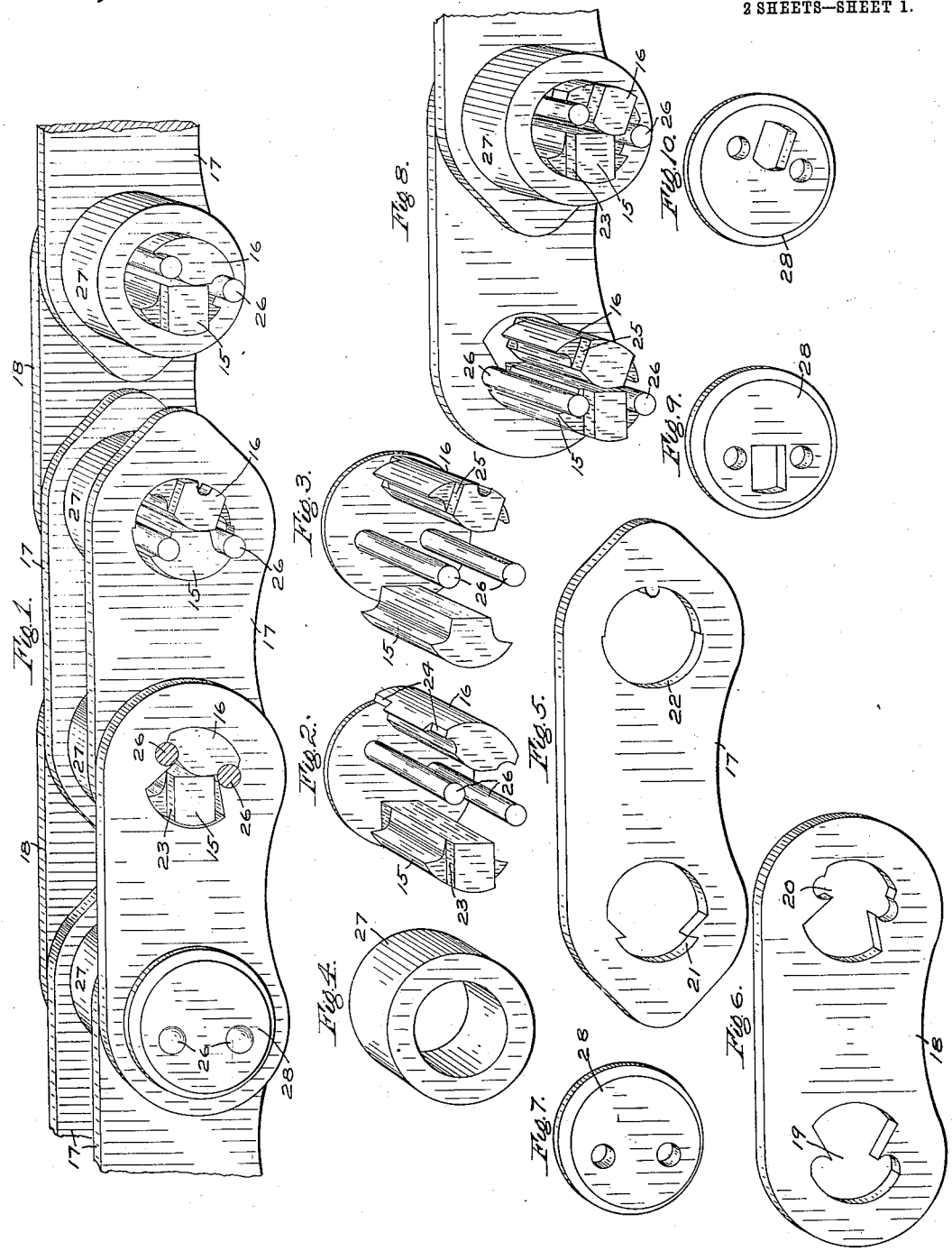

UNITED STATES PATENT OFFICE.

FRANK L. MORSE, OF ITHACA, NEW YORK, ASSIGNOR TO MORSE CHAIN COMPANY, OF ITHACA, NEW YORK, A CORPORATION OF NEW YORK.

SPROCKET-CHAIN.

953,427.  Specification of Letters Patent.  Patented Mar. 29, 1910.

Application filed June 27, 1908. Serial No. 440,732.

*To all whom it may concern:*

Be it known that I, FRANK L. MORSE, a citizen of the United States, residing at Ithaca, in the county of Tompkins and State of New York, have invented new and useful Improvements in Sprocket-Chains, of which the following is a specification.

This invention relates to drive chains for sprocket wheels, and more particularly to chains of the open link type in which the links are formed with side plates or bars between which the teeth of the sprocket wheels extend; the present invention also has special reference to chains of this class such as shown in prior Morse patents #663,352 and #663,353, of December 4, 1900, and #799,074, of September 12, 1905, in which the joint pintle is formed in a plurality of parts, preferably two, one part being adapted to bear and turn upon another as the joint bends.

The present invention has for its objects, to increase the durability and wear of chains of this character by extending the bearing surface between the pintle parts, and increasing the shearing strength of the joint; to provide improved means for holding the pintle parts in place and for securing the parts of the joint together; and to simplify and improve certain other features of construction which will hereinafter be more fully set forth and claimed.

In the accompanying drawing; Figure 1 is a perspective view of several links of one form of chain embodying my improvements, and having some of the washers and side plates removed to more clearly show the joints; Fig. 2 a perspective view showing the parts of one of the joints slightly separated; Fig. 3 a similar view showing the parts of the adjacent joint; Fig. 4 a perspective view of a roller for the joint; Fig. 5 a perspective view of one of the inside link plates; Fig. 6 a similar view of one of the outside link plates; Fig. 7 a perspective view of one form of washer; Fig. 8 a perspective view of a portion of two links of a chain showing a slight modification, the side plates on one side and one of the rollers being removed to more clearly show the construction of the joints; Fig. 9 a perspective view of a modified form of washer to be used with one of the joints illustrated in Fig. 8; Fig. 10 a similar view of a washer adapted to be used on the adjacent joint shown in Fig. 8; Fig. 11 a horizontal sectional view of a few links of the chain illustrated in Fig. 1; Fig. 12 a side elevation of the same; and Figs. 13 and 14 a plan and side view respectively of a modified form of chain having bent side link plates.

As shown in the drawing, the adjacent links of the chain are composed of two outside plates and two inside plates respectively, the links being joined by pintle parts which pass through suitably shaped apertures in the ends of the plates. In the chain construction as shown in the prior patents above referred to, only one of the pintle parts extends through the outside link plates so that the bearing of the pintle parts one upon another is less than the full width of the outside links and the shearing strength of the joint is limited to the cross sectional area of only one of the pintle parts. According to my present improvements all of the pintle parts of the joint are extended through both the inside and outside link plates thereby increasing the length of the bearing of one of said parts upon another by the thickness of the outside plates, and adding to the shearing strength by the full cross sectional area of all of the pintle parts.

Any desired number of pintle parts may be employed in the joint, and these parts may be of any suitable form or configuration having a bearing one upon another throughout their length, but I prefer to employ pintles constructed in two parts and to so form the bearing surfaces between the same that one shall have a rolling engagement with the other. As shown in the drawing, one of these pintle parts 15 is formed with a substantially plane bearing surface, and is termed the seat pin, while the other pintle part 16 is formed with a curved or rounded bearing surface and is termed the rocker, the seat pins being preferably arranged to all face in the same direction and both pintle parts extending through suitably formed apertures in both the inside link plates 17 and outside link plates 18 at each joint.

The apertures 19 and 20 in the ends of the outside link plates are preferably shaped to hold in place one part of the pintle, such as the seat pin at one end and the rocker pin at the other end, each aperture also providing ample clearance for the movement of the part of the pintle not held therein. The pintle parts may also be shouldered at the point where they pass through apertures in the link plates for clearance purposes.

As shown in the drawings, the seat pins 15 are shouldered at 23 at each alternate joint for angular clearance in the apertures 20 of the outside plates 18 while the rocker pins 16 are shouldered at 25 at the intermediate joints for clearance in the apertures 19 at the other end of each outside link plate 18.

The apertures 21 at one end of the inside link plate 17 may be formed to hold in place the seat pin 15 and to permit free movement of the other parts of the pintle, while the aperture 22 at the other end of the inside link plate 17 engages with the rocker 16 but provides clearance for the free movement of the seat pin member.

For the purpose of securely holding the joint and the parts of the chain together I preferably provide rivet pins 26 of soft metal which extend through the apertures in the link plates and through the outside washers 28 on which the pins are riveted. The seat pin and rocker pin may be provided with grooves or recesses into which the rivet pins fit for the purpose of holding the respective pintle parts in place at each alternate joint, the apertures in the outside link plates being formed to hold the rivet pins and one of the pintle parts as indicated. The rocker pins at each alternate joint may also be notched, as indicated at 24 to provide angular clearance in the oppositely leading inside plates.

If desired the seat pins or rocker pins may be provided with shouldered projections at each alternate joint for extending through corresponding openings in the washers 28, as indicated in Figs. 8, 9 and 10.

On the joint pins are mounted the usual rollers 27 for engaging the teeth of the sprocket wheels.

By means of this construction the seat pin members of the pintles with their rivet pins are held in the apertures of the outside plate at each alternate joint, while the rocker members with their rivet pins are held in the outside plates at the other joints at which the seat pins are also held in the apertures of the inside plates. The rivet pins of soft metal form a convenient means for holding the parts of the chain together at the joint, as the rivet pins can be easily extracted or renewed and the joints readily taken apart or assembled as desired.

According to the modification illustrated in Figs. 13 and 14, the links are formed of bent side plates 29 so that each one has an outside end and an inside end and all of the joints may be alike, the apertures at the outside ends of the link plates being formed to hold in place the seat pin members 15 with their rivet pins 26 and to provide clearance for the rocker 16 which extends through both the outside and inside plates and bears upon the seat pin throughout the full width of the chain. The rivet pins extend through the washers 28 to which they are riveted as before described.

Having now described my invention, what I claim as new and desire to secure by Letters Patent, is:—

1. An open link chain having links composed of side plates, and pintles formed in two parts, both of said parts extending through the side plates of the two adjacent links at each joint and bearing upon each other throughout the full outside width of the links of the chain.

2. In an open link chain, links composed of side plates, and pintles formed in two parts extending through both pair of adjacent link plates at each joint, one part of the pintle being held by the plates of one link and adapted to turn upon the other part of the pintle.

3. In an open link chain, links composed of side plates, and pintles formed in two parts extending through both pair of adjacent link plates at each joint, the pintle parts bearing upon each other with a rolling engagement throughout the full outside width of the links.

4. In an open link chain, links composed of side plates, and pintles formed in two parts extending through both pair of adjacent link plates at each joint, one pintle part engaging with the plates of one link and the other pintle part engaging with the plates of the adjacent link.

5. In a drive chain the combination with link plates, of pintles formed in two separate parts extending through said link plates, washers on the outside of the joints, and rivet pins also extending through said plates and riveted to said washers.

6. A drive chain having links composed of a plurality of plates with apertures at their ends, pintles formed in two parts extending through said apertures, washers for holding the parts of the chain together, and rivet pins also extending through said apertures and connected to said washers.

7. A drive chain having links composed of a plurality of plates with apertures at their ends, pintles formed in a plurality of parts extending through said apertures, and rivet pins also passing through the apertures, said apertures being formed to hold in place one part of the pintle and the rivet pins and to permit free movement of another part of the pintle.

8. A drive chain having links composed of side plates with apertures at their ends, pintles formed in two parts extending through the apertures of the plates of both adjacent links and adapted to bear upon each other, said pintle parts being shouldered at their ends to give greater angular clearance in the apertures of oppositely leading plates.

9. A drive chain having links composed of side plates with apertures at their ends, pintles formed in two parts, comprising a rocker and a seat pin, extending through said apertures in the side plates of the adjacent links, the apertures in the plates of one link at each joint being formed to hold the seat pin in place.

10. A drive chain having links composed of side plates with apertures at their ends, pintles formed in two parts, comprising a rocker and a seat pin, extending through said apertures in the side plates of the adjacent links, the apertures in the plates of one link at each adjacent joint being formed to hold the rocker pin in place.

11. A drive chain having links composed of side plates with apertures at their ends, pintles formed in two parts, comprising a rocker and a seat pin, extending through said apertures in the side plates of the adjacent links, and outside washers at the joints, the seat pin and rocker pin being alternately extended through said washers at the joints.

12. A drive chain having adjacent links composed of two outside plates and two inside plates respectively, pintles formed in two parts extending through apertures in both pair of side plates and bearing upon each other throughout the full width of the outside links, and a roller mounted on the pintle between the side plates.

In testimony whereof I have hereunto set my hand.

FRANK L. MORSE.

Witnesses:
R. F. EMERY,
WM. M. CADY.